Sept. 27, 1960　　　　　R. CHUTE　　　　　2,953,901
GAS TURBINE REGENERATOR DRIVE MECHANISM
Filed Dec. 22, 1955　　　　　　　　　4 Sheets-Sheet 4

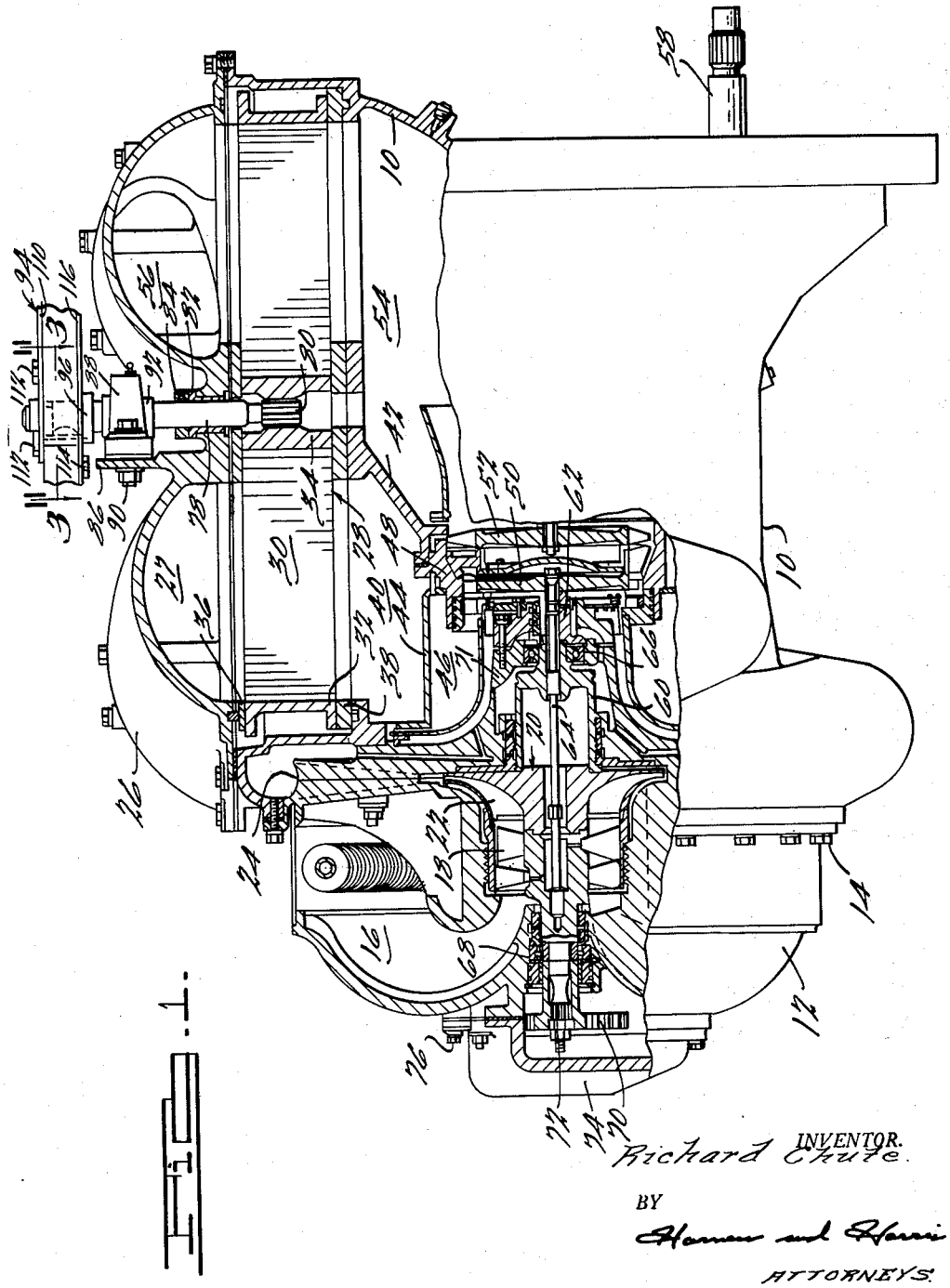

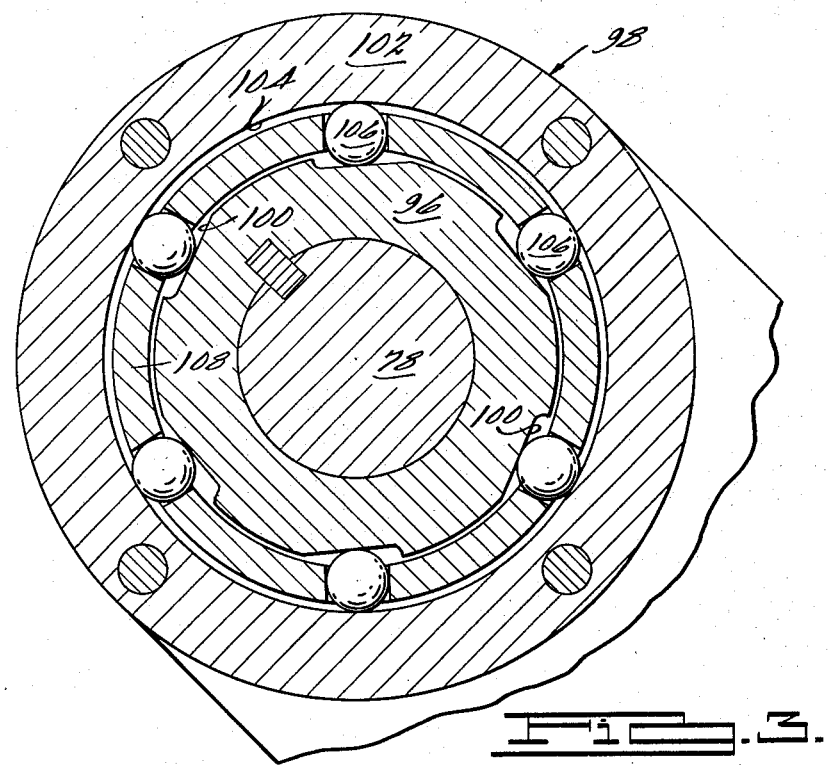
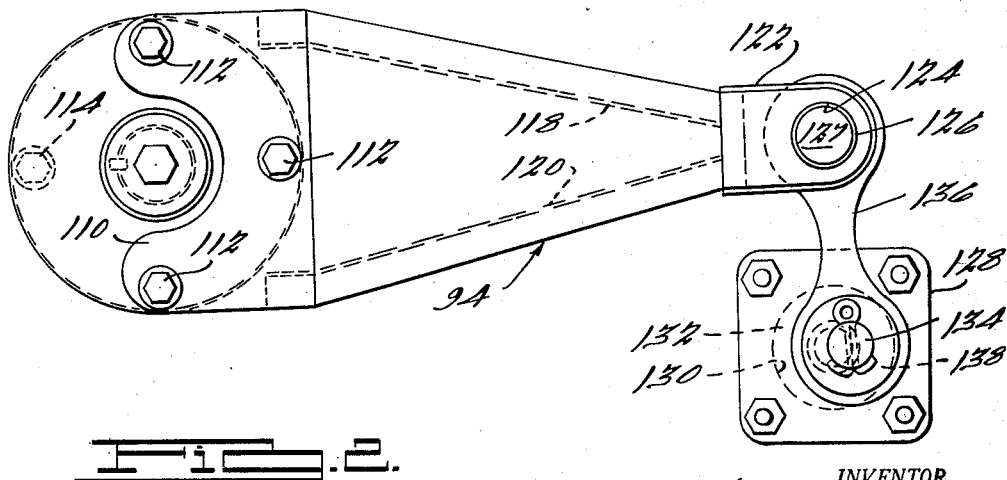

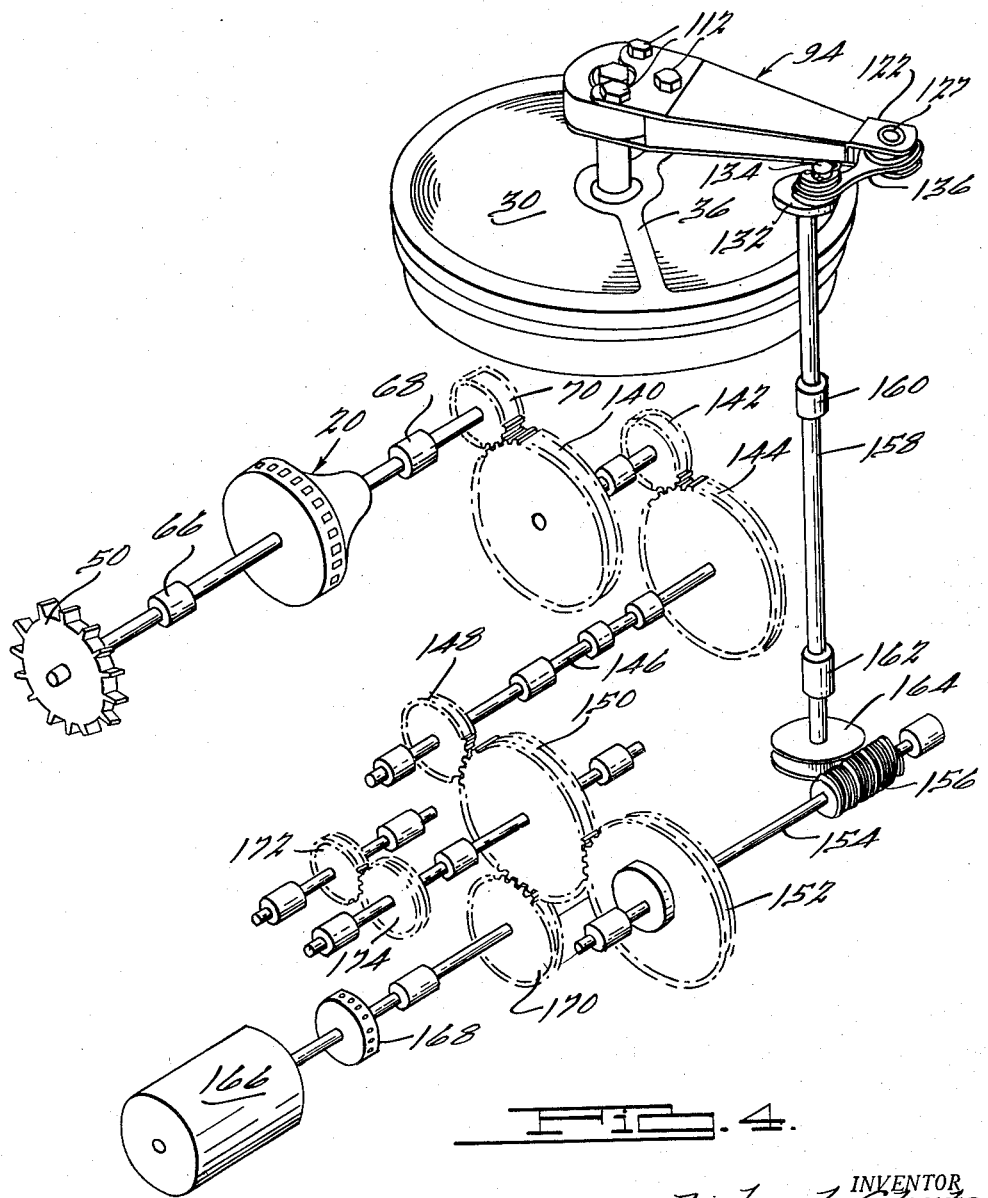

INVENTOR.
Richard Chute.
BY
ATTORNEYS.

United States Patent Office 2,953,901
Patented Sept. 27, 1960

---

2,953,901

GAS TURBINE REGENERATOR DRIVE MECHANISM

Richard Chute, Huntington Woods, Mich., assignor to Chrysler Corporation, Highland Park, Mich., a corporation of Delaware Filed Dec. 22, 1955, Ser. No. 554,844

8 Claims. (Cl. 60—39.51)

My invention relates generally to fuel combustion apparatus having a regenerative cycle and more particularly to a new and improved means for driving the rotary portions of a rotary regenerator mechanism for a gas turbine power plant or the like.

The improved regenerator driving means of my instant invention is particularly adapted to be used with gas turbines capable of powering automotive type vehicles although I contemplate that it may also have a variety of other adaptations.

When a rotary regenerator is applied to a gas turbine power plant of the automotive type, it is desirable to provide a driving connection between the turbine stage and the rotary matrix of the regenerator for powering the latter. Since it is not uncommon to obtain turbine speeds greatly in excess of 20,000 r.p.m. and since the regenerator operates most efficiently when the matrix thereof is rotated at relatively low speeds, that is speeds less than 10 r.p.m., the driving connection must be capable of supplying an extremely high speed reduction between the power input and power output members. Also, since the space allotment for the power plant is often meager, the use of a complex space-consuming mechanism for accomplishing this speed reduction is not practical.

According to a principal feature of my invention I have provided a rotary regenerator driving mechanism which is particulary adapted for installations of this type. The provision of such an improved regenerator drive being a principal object of my invention, it is a further object of my invention to provide a rotary regenerator drive mechanism having a minimum number of moving parts and having few, if any, highly stressed components.

It is another object of my invention to provide a rotary regenerator drive having a very high speed reduction ratio as set forth above which is further characterized by its simplicity in construction and operation.

It is a further object of my invention to provide a rotary regenerator drive which is substantially unaffected by thermal distortion of the rotary regenerator matrix.

Other objects and features of my invention will become apparent from the following description.

In carrying forth the foregoing objects, an accessory drive shaft may be driveably connected to the rotary turbine elements of the power plant and an eccentric or a cam element may be positively connected to the accessory shaft. An operating lever arm may be pivoted for reciprocating motion about one end thereof, and the other end of the lever arm may be connected to the eccentric or cam by a suitable linkage arrangement. The one end of the lever arm may be driveably connected to the hub portion of the regenerator matrix by means of a one-way clutch mechanism thereby causing the matrix to rotate continually in one direction with an indexing motion as the lever arm is reciprocated by the eccentric or the cam during operation of the power plant.

For the purpose of more particularly describing my invention reference will be made to the accompanying drawings wherein:

Figure 1 shows a partial sectional view of a gas turbine power plant arrangement of the automotive type incorporating a rotary regenerator capable of being driven by the drive mechanism of our instant invention;

Figure 2 is a detail view of the regenerator matrix operating lever arm with an eccentric for reciprocating the same;

Figure 3 is a detail sectional view of a one-way clutch structure driveably connecting the hub of the regenerator matrix with the operating lever arm of Figure 2 and is taken along section line 3—3 of Figure 1;

Figure 4 is a schematic representation of the principal elements of a regenerator drive of my invention including the turbine driven accessory shaft above mentioned;

Figure 5:
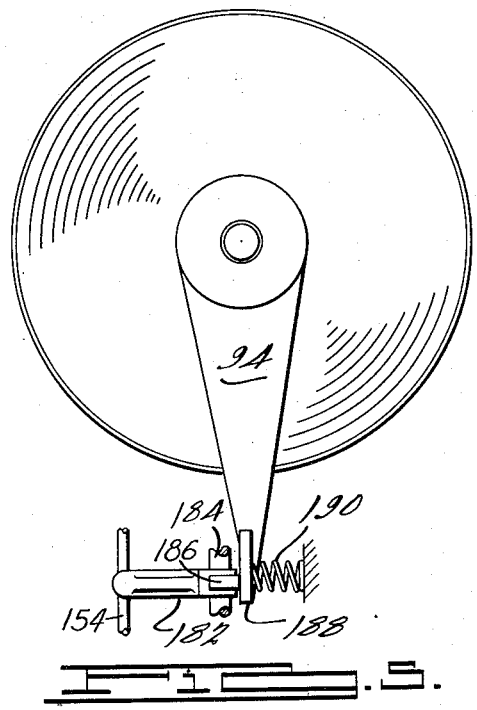
Figures 5 and 6 show an alternate means for obtaining a reciprocating motion between the accessory shaft and the extended end of the actuating lever arm.

Referring first to Figure 1, I have illustrated an automotive type gas turbine power plant embodying the improved regenerator drive of my instant invention. This power plant has been disclosed in the copending application of George J. Huebner et al., Serial No. 389,094, now Patent No. 2,795,928, which is assigned to the assignee of my instant invention.

In general, the power plant comprises a main power plant cast housing 10 and a cast end housing portion 12, the latter being secured to the main housing 10 by peripherally spaced bolts 14. A compressor inlet passageway is defined by the housing portion 12 as indicated at 16, said passageway being formed with a double curvature with the radially outward end thereof communicating with the ambient air and with the radially inward end thereof extending in an axial direction so as to conduct intake air to the inlet side of the bladed inducer section 18 of a centrifugal compressor rotor generally designated by numeral 20. The rotor 20 includes rotor blades 22 which direct the intake air in a radially outward direction into a diffuser 24 having a progressively increasing cross sectional area. The diffuser 24 is formed with a generally spiral configuration encircling the axis of the rotor 20 and it is effective to convert the velocity pressure of the air as it is discharged from the tip of the blades 22 to static pressure in order that it might be useful in maintaining combustion in the power plant burner. The terminal section of the diffuser 24 is defined by a cavity 27 enclosed by a cover 26 situated on top of the engine as indicated.

A rotary regenerator is rotatably mounted in the upper portion of the power plant and is generally designated in Figure 1 by numeral 28. This regenerator 28 comprises a generally cylindrical matrix 30, a rim 32 and a hub 34. Means are provided for driving the regenerator 28 about the axis of the hub 34 during operation of the engine at a relatively low speed and suitable sealing structure may be disposed between the upper side of the regenerator 28 and the cover 26 and between the supporting portions of the main cast housing 10 and the other side of the regenerator 28, said sealing structure being indicated by numerals 36 and 38 respectively. The above-mentioned regenerator drive mechanism will be described in more particular detail with reference to the other figures.

Cavity 27 extends over a section of the regenerator matrix 30 and the compressed intake air passes from the cavity 27 through vertically extending passages formed in the regenerator matrix 30 into a lower collecting chamber 40 defined in part by an internal separating wall 42 and a baffle 44, said wall 42 forming a part of the main cast housing 10. The collecting chamber 40 communicates with a fuel combustion burner, not shown, which mixes liquid fuel with the air to provide for continuous combustion of the fuel thereby producing high temperature and high velocity combustion gases which are caused to flow through the interior 46 of the baffle 44. The combustion gases then pass through an annular passageway defined by a turbine nozzle block assembly 48, a primary bladed turbine wheel 50 and a secondary power output wheel 52, thereby imparting a driving torque to each of the turbine wheels 50 and 52. The gases are then exhausted into an exhaust gas chamber 54 situated below another segment of the regenerator matrix 30. The combustion gases then pass vertically upward through the above-mentioned matrix passages into the exhaust cavity 56 defined by the cover 26. A suitable exhaust conduit, not shown, may communicate with the cavity 56 to accommodate the flow of exhaust gases through a conveniently located exhaust port.

The output turbine 52 is driveably connected to a power output shaft 58 through a suitable speed reduction power transmission, not shown, situated within the main housing 10. The primary turbine wheel 50, also referred to as the compressor turbine wheel, is connected to the rotor 20 to form a unitary subassembly, said compressor rotor 20 acting as a power absorbing means and the turbine wheel 50 acting as the driving means. The connecting structure between the rotor 20 and the turbine wheel 50 includes a pair of spacers 60 and 62 interposed between the rotor 20 and the turbine wheel 50. A turbine shaft 64 is threadably connected to the inducer section 18 of the rotor 20 and extends axially through the rotor 20, the spacers 60 and 62 and the turbine wheel 50, said turbine shaft 64 maintaining the elements of the subassembly in axially stacked relationship.

The subassembly comprising the rotor 20 and the turbine wheel 50 may be journalled by suitable bearings at spaced locations as indicated at 66 and 68. The bearing 66 is positioned in an internal extension 70 of the cast housing 10, and the bearing 68 is supported by the end housing portion 12. A shaft extension is formed on the inducer section 18 of the rotor 20 and is driveably connected to an accessory gear 70 by a suitably splined connection 72, and other accessory gears later to be described are driveably engaged with the gear 70 and enclosed by accessory cover plate 74 bolted to the end of the portion 12 by bolts 76.

Referring again to the regenerator driving means located at the top of the power plant assembly as illustrated in Figure 1, the above mentioned regenerator hub means 34 may be splined to the end of a vertically situated driving shaft 78 as indicated at 80. Shaft 78 may extend through the center of the cover 26 and may be journalled therein by a suitable bushing 82, said shaft being positioned by a collar 84 located on one side of the bushing 82. The cover 26 is formed with a mounting flange 86 to which may be secured a bearing housing 88, suitable fastening bolts 90 being provided for this purpose. The housing 88 encircles the shaft 78 and encloses a bushing 92 for journalling the shaft 78. The upper end of the shaft 78 may be driveably connected to an operating lever arm 94 by means of a one-way driving connectinon as best seen in Figure 3.

Referring next to Figures 2 and 3, the above-mentioned driving connection of the lever arm 94 is particularly illustrated. It may be seen that the shaft 78 is keyed to the inner race 96 of a one-way clutch device generally designated in Figure 3 by numeral 98, said inner race 96 being circular in shape and having a plurality of peripherally spaced cam surfaces 100. The outer race of the clutch 98 is shown at 102 and it is provided with a cylindrical inner clutch surface 104 radially spaced from the cam surfaces 100 of the inner race 96. A plurality of balls 106 is interposed between the cam surfaces 100 and the clutch surfaces 104 of the outer race 102, one ball being engaged with each of the cam surfaces 100. The balls 106 are held in spaced relationship by a cage member shown at 108, the spacer portion of the cage member 108 being disposed between each of the balls for moving the same substantially in unison.

The outer race 102 may be bolted to the upper side 110 of the actuating lever arm 94 by bolts 112 and the lower side of the actuating lever 94 may be secured to the race 102 by a bolt 114, said lower side being best identified in Figure 1 at 116.

By preference the actuating lever arm 94 is hollow and is formed with a rectangular cross section of varying area thereby providing a higher section modulus for the same in the vicinity of the one-way clutch 98 than at the extended end.

The upper and lower sides 110 and 116 of the lever 94 are interconnected by spacer walls 118 and 120. A U-shaped bracket 122 is carried by the extended end of the lever 94 between the upper and lower sides 110 and 116 of the lever 94. The arms of the bracket 122 are situated in engaged relationship with respect to the lever sides 110 and 116.

An opening 124 is formed in the bracket 122 and in the adjacent upper and lower sides 110 and 116 of the lever 94, and a bushing 126 is positioned therein as indicated. A bearing pin 127 may be received within the bushing 126 thereby forming a bridge between the arms of the U-bracket 122.

A bearing housing 128 is fixed to a stationary portion of the cast housing and is formed with a bearing opening 130. A circular bearing element 132 is journalled in the opening 130 and is formed with an eccentrically placed pin 134. A connecting link 136 interconnects the pin 134 with the aforementioned pin 127 and each end thereof is formed with an eyelet surrounding its associated pin. The eyelet at one end of the link 136 surrounds the bushing 126 and the eyelet at the other end of the link 136 surrounds a bushing 138 which is positioned about the pin 134.

As the bearing member 132 is rotated about its axis, the extended end of the actuating lever 94 will be reciprocated about the axis of the one-way clutch 98 by reason of the connection between the pin 127 with the eccentrically positioned pin 134 and this reciprocating motion will take place as long as a rotary movement is imparted to the bearing member 132. This reciprocating movement of the lever 94 will be accompanied by a corresponding movement of the outer race 102 of the one-way clutch 98. Upon movement of the race 102 in a clockwise direction, as viewed in Figure 3, the balls 106 will tend to ride up their respective cam surfaces 100 to form a driving connection between the inner and outer races 102 and 96 thereby imparting a driving motion to the regenerator driving shaft 78. Upon a return movement of the outer race 102 in a counterclockwise direction as viewed in Figure 3, the outer race 102 will move independently of the inner race 96 since in this instance the balls 106 will ride downward along their respective cam surfaces.

Referring next to Figure 4, I have schematically illustrated a means for obtaining the rotary motion of the bearing member 132 which is required to effect the above-described reciprocating motion of the lever arm 94. The above mentioned accessory gear 70, which is rotatably coupled to the compressor turbine and compressor rotor subassembly, is driveably engaged with a second accessory gear 140 which in turn is positively coupled to a third accessory gear 142 of relatively small pitch diameter. The gear 142 is driveably engaged with a large pitch diameter accessory gear 144 secured to one end of a countershaft 146. A fifth accessory gear 148 is carried by the other end of the countershaft 146 and is driveably engaged with a relatively large diameter accessory gear 150. The gear 150 is engaged with another accessory gear 152 carried by a second countershaft 154, said countershaft also carrying a worm 156. A vertically extending shaft 158 may be suitably journalled in the cast housing 10 in spaced locations 160 and 162 and may carry a worm gear 164 which is driveably engaged with the worm 156. It will therefore be apparent that a rotary motion of the compressor turbine wheel 50 will be transmitted through a plurality of interengaged accessory gears to drive the shaft 158 continually in one direction at a speed which is greatly reduced in magnitude in comparison with the speed of the turbine wheel 50. If desired, a starter generator unit 166 and an oil pump type speed sensor unit 168 may be powered by an auxiliary gear 170 driveably engaged with the gear 150 as illustrated. Also the gear 150 may be employed to drive a pair of intermeshed oil pump gears 172 and 174.

The shaft 158 is adapted to drive the bearing member 132 and the rotary motion of the shaft 158 is translated into an indexing motion of the regenerator 30 as above explained. As the regenerator is thus revolved about the axis of its hub, the segment thereof coming in contact with the hot exhaust gases will readily assume the temperature of the exhaust gases and as this heated portion of the matrix intersects the path of movement of the intake air on the upstream side of the burner, the thermal energy which is stored in the matrix will be transferred to the intake air thereby causing this thermal energy to be efficiently utilized in the regenerative cycle. The exhaust gases therefore leave the power plant at a reduced temperature. When the same matrix segment again comes in contact with the heated exhaust gases, it will again be raised to an elevated temperature and the above described regenerating cycle is again repeated. This process takes place continuously during operation of the engine.

Figure 6:
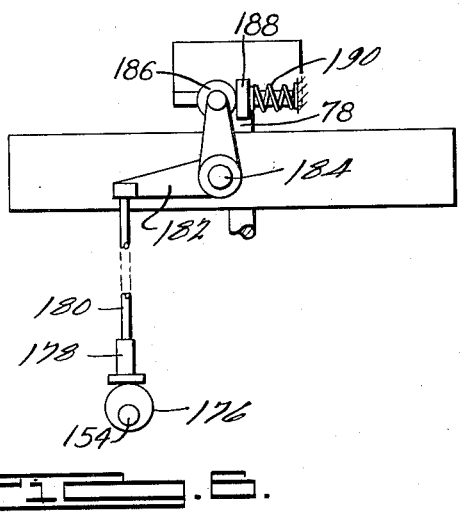

Referring next to Figures 5 and 6, I have schematically illustrated an alternate means for obtaining the above-described reciprocating motion of the actuating lever arm 94. In this case the above-mentioned worm 156, worm gear 164 and the shaft 158 may be omitted and the accessory shaft 154 may instead be provided with a cam or eccentric 176 which is adapted to engage a cam follower 178 formed on the lower end of a push rod 180, said push rod extending vertically upward through suitable guides provided in the cast housing 10. The upper end of the push rod 180 engages one arm of a bellcrank 182, said bellcrank being pivotally mounted at 184 to a fixed portion of the cast housing 10 in the vicinity of the regenerator structure. The other arm of the bellcrank 182 may carry a roller 186 which is adapted to engage a shoe 188 carried by the extended end of the actuating lever arm 94. A spring 190 may be positioned on the opposite side of the shoe 188 for biasing the same into engagement with the roller 186. Thus as the accessory shaft is driven by means of the accessory gear train, the push rod 180 is reciprocated in a vertical direction thereby causing the bellcrank 182 to oscillate about its fixed bearing mount 184. A downward movement of the shaft 180 will be accompanied by a clockwise movement of the one-way clutch race 102 induced by spring 190, thereby imparting an indexing motion to the regenerator core. Upward movement of shaft 180 compresses spring 190 and returns the driving assembly to the other extreme position since the driving load is relieved by reason of the one-way clutch structure 98.

Although I have illustrated certain preferred embodiments of my instant invention, I comtemplate that other variations may be made thereto without departing from the scope of the invention as defined by the accompanying claims. For example, the specific one-way clutch structure described herein may be replaced by any of a variety of mechanisms capable of translating the reciprocating motion of the actuating lever arm into an indexing motion of the regenerator core. Also, I contemplate that various other types of mechanisms for obtaining reciprocating movement of the extended end of the actuating arm may be employed with success and the specific constructions hereinbefore described are merely illustrative ad are by no means exhaustive in scope.

What I claim and desire to secure by United States Letters Patent is:

1. In a gas turbine engine, an engine housing, an axial flow rotatable regenerator having opposed axially spaced faces and being arranged for passage of gases axially therethrough in heat transfer relationship, said regenerator and housing defining a comparatively low pressure high temperature chamber confronting one regenerator face, an air compressor, power means including a burner and a gas driven rotor mounted in said chamber, said rotor being operatively connected with said compressor to drive the latter, said housing including a cover extending across the other regenerator face and having separate portions spaced from said other face to define separate inlet and exhaust cavities overlying inlet and exhaust sections respectively of said regenerator, duct means for conducting pressurized combustion supporting air from said compressor to said inlet cavity, means providing a seal between the portion of said cover defining said inlet cavity and said other face around the periphery of said inlet section to direct said pressurized air through said inlet section into said low pressure chamber, means in said low pressure chamber for directing said air to said power means to drive said rotor and thence through said exhaust section into said exhaust cavity, a rotatable shaft secured to said regenerator to rotate the same and extending coaxially therefrom through said cover, a pivotal actuating arm extending radially from said shaft at a location exteriorly of said cover, one-way driving means connecting the radially inner end of said arm to said shaft at said location to rotate said shaft in one direction upon pivotal oscillation of said arm, a rotatable member, a link pivotally connected with said rotatable member eccentrically of the latter's axis of rotation and with the radially outer end of said arm to oscillate the latter upon rotation of said rotatable member, and speed reduction means operatively connecting said rotor and rotatable member to rotate the latter at reduced speed with respect to the speed of said rotor.

2. In the combination according to claim 1, said one-way driving means including a clutch race secured to the radially inner end of said arm to oscillate therewith, a second clutch race mating with the first clutch race and attachable to said shaft at said location to drive said shaft, one-way clutch elements interposed between said races for transmitting driving torque in only one direction from the first to the second race to rotate said regenerator, and said speed reduction means includes a speed reducing gear train operatively connected with said rotor.

3. In a gas turbine engine, an engine housing, an axial flow rotatable regenerator having opposed axially spaced faces and being arranged for passage of gases axially therethrough in heat transfer relationship, said regenerator and housing defining a comparatively low pressure high temperature chamber confronting one regenerator face, an air compressor, power means including a burner and a gas driven rotor mounted in said chamber, said rotor being operatively connected with said compressor to drive the latter, said housing including a cover extending across the other regenerator face and having separate portions spaced from said other face to define separate inlet and exhaust cavities overlying inlet and exhaust sections respectively of said regenerator, duct means for conducting pressurized combustion supporting air from said compressor to said inlet cavity, means providing a seal between the portion of said cover defining said inlet cavity and said other face around the periphery of said inlet section to direct said pressurized air through said inlet section into said low pressure chamber, means in said low pressure chamber for directing said air to said power means to drive said rotor and thence through said exhaust section into said exhaust cavity, a rotatable shaft secured to said regenerator to rotate the same and extending coaxially therefrom through said cover, a pivotal actuating arm extending radially from said shaft at a location exteriorly of said cover, said arm having its radially inner end pivotal coaxially with the axis of rotation of said regenerator and having a swinging outer end extending radially beyond the circumference of said regenerator, one-way driving means connecting said arm and shaft at said location to rotate said shaft in one direction upon swinging oscillation of said arm, a rotatable member having an eccentric element, a link connecting said eccentric element and swinging end to pivotally oscillate the latter upon rotation of said rotatable member, the connection between said link and swinging end being radially outward of the circumference of said regenerator, and speed reduction means operatively connecting said rotor and rotatable member to rotate the latter at reduced speed with respect to the speed of said rotor.

4. In a gas turbine engine, an engine housing, a cylindrical axial flow rotatable regenerator having opposed axially spaced faces and being arranged for passage of gases axially therethrough in heat transfer relationship, said regenerator and housing defining a comparatively low pressure high temperature chamber confronting one regenerator face, an air compressor, power means including a burner and a gas driven rotor mounted in said chamber, said rotor being operatively connected with said compressor to drive the latter, said housing including a cover fixed therewith and extending across the other regenerator face and having separate portions spaced from said other face to define separate inlet and exhaust cavities overlying inlet and exhaust sections respectively of said regenerator, duct means for conducting pressurized combustion supporting air from said compressor to said inlet cavity, means providing a seal between the portion of said cover defining said inlet cavity and said other face around the periphery of said inlet section to direct said pressurized air through said inlet section into said low pressure chamber, means in said low pressure chamber for directing said air to said power means to drive said rotor and thence through said exhaust section into said exhaust cavity, a rotatable shaft secured to said regenerator to rotate the same and extending coaxially therefrom through said cover, bearing means carried by said cover and rotatably supporting said shaft, a pivotal actuating arm extending radially from said shaft at a location exteriorly of said cover, said arm having its radially inner end pivotal coaxially with the axis of rotation of said regenerator and having a swinging outer end extending radially beyond the circumference of said regenerator, one-way clutch means connecting said arm and shaft at said location to rotate said shaft in one direction upon swinging oscillation of said arm, a rotatable member having an eccentric element, a link connecting said eccentric element and swinging end to pivotally oscillate the latter upon rotation of said rotatable member, the connection between said link and swinging end being radially outward of the circumference of said regenerator, and speed reduction means operatively connecting said rotor and rotatable member to rotate the latter at reduced speed with respect to the speed of said rotor.

5. In a gas turbine engine, an engine housing, an axial flow rotatable regenerator having opposed axially spaced faces and being arranged for passage of gases axially therethrough in heat transfer relationship, said regenerator and housing defining a comparatively low pressure high temperature chamber confronting one regenerator face, an air compressor, power means including a burner and a gas driven rotor mounted in said chamber, said rotor being operatively connected with said compressor to drive the latter, said housing including a cover extending across the other regenerator face and having separate portions spaced from said other face to define separate inlet and exhaust cavities overlying inlet and exhaust sections respectively of said regenerator, duct means for conducting pressurized combustion supporting air from said compressor to said inlet cavity, means providing a seal between the portion of said cover defining said inlet cavity and said other face around the periphery of said inlet section to direct said pressurized air through said inlet section into said low pressure chamber, means in said low pressure chamber for directing said air to said power means to drive said rotor and thence through said exhaust section into said exhaust cavity, a rotatable shaft secured to said regenerator to rotate the same and extending coaxially therefrom through said cover, a pivotal actuating arm extending radially from said shaft at a location exteriorly of said cover, one-way driving means connecting the radially inner end of said arm to said shaft at said location to rotate said shaft in one direction upon pivotal oscillation of said arm, a rotatable member, means operatively connecting said rotatable member eccentrically with the radially outer end of said arm to oscillate the latter upon rotation of said rotatable member, and speed reduction means operatively connecting said rotor and rotatable member to rotate the latter at reduced speed with respect to the speed of said rotor.

6. In the combination according to claim 5, said means operatively connecting said rotatable member and arm including a pivotal element having a pivot axis transverse to the axis of rotation of said regenerator and having a pair of swinging portions on radii from said pivot axis extending transversely with respect to each other, one of said swinging portions engaging said outer end of said arm, a reciprocable link extending transversely to the axis of rotation of said rotor and having one end engaging the other of said swinging portions to pivot said pivotal element and move said arm in one direction during predetermined shifting of said link, a rotary member having an eccentric cam contoured to maintain contact with the opposite end of said reciprocable link and to effect said predetermined shifting of the latter upon rotation of said rotary member, resilient means yieldably opposing movement of said arm in said one direction and being effective to maintain engagement between said arm and said one swinging portion and between said cam and reciprocable link during comparatively high speed rotation of said rotary member.

7. In the combination according to claim 5, said means operatively connecting said rotatable member and arm including a pivotal element having a pivot axis transverse to at least one of the axes of rotation of said regenerator and rotor wheel and having a pair of swinging portions on radii from said pivot axis extending transversely with respect to each other, one of said swinging portions engaging said outer end of said arm, cam means engaging the other of said swinging portions to pivot said pivotal element and more said arm in one direction during predetermined operation of said cam means, resilient means yieldably opposing movement of said arm in said one direction and being effective to maintain the engagement of said swinging portions with said arm and cam means respectively during comparatively high speed operation of said cam means.

8. In the combination according to claim 5, said means operatively connecting said rotatable member and arm including a second rotatable shaft having its axis of rotation transverse to at least one of the axes of rotation of said rotor and regenerator and having an eccentric element at one end, and a link pivotally connected with said eccentric element and with said outer end of said arm to oscillate the latter upon rotation of said shaft.

References Cited in the file of this patent

UNITED STATES PATENTS 492,274    Currie    Feb. 21, 1893

(Other references on following page)

UNITED STATES PATENTS

| | | | |
|---|---|---|---|
| 1,652,025 | Ljungstrom | Dec. 6, | 1927 |
| 2,229,691 | Boestad | Jan. 28, | 1941 |
| 2,256,466 | Cullin | Sept. 23, | 1941 |
| 2,380,778 | Murdock | July 31, | 1945 |
| 2,521,211 | Ganz | Sept. 5, | 1950 |
| 2,667,034 | Alcock | Jan. 26, | 1954 |
| 2,744,413 | Schneider | May 8, | 1956 |

FOREIGN PATENTS

| | | | |
|---|---|---|---|
| 897,094 | France | May 15, | 1944 |
| 1,009,506 | France | May 30, | 1952 |
| 477,757 | Germany | Nov. 28, | 1941 |
| 914,814 | Germany | May 26, | 1954 |
| 3,879 | Great Britain | Feb. 20, | 1908 |
| 119,213 | Switzerland | July 8, | 1947 |

UNITED STATES PATENT OFFICE
CERTIFICATE OF CORRECTION

Patent No. 2,953,901             September 27, 1960

Richard Chute

It is hereby certified that error appears in the printed specification of the above numbered patent requiring correction and that the said Letters Patent should read as corrected below.

Column 1, line 22, for "automative" read -- automotive --; column 6, line 3, for "ad" read -- and --; column 8, line 54, for "more" read -- move --.

Signed and sealed this 11th day of April 1961.

(SEAL)
Attest:

ERNEST W. SWIDER            ARTHUR W. CROCKER
Attesting Officer             Acting Commissioner of Patents